(12) United States Patent  
Menard

(10) Patent No.: US 7,175,227 B2
(45) Date of Patent: Feb. 13, 2007

(54) SENSOR SYSTEM FOR VEHICLE DOOR

(75) Inventor: Robert J. Menard, Crystal Lake, IL (US)

(73) Assignee: Temic Automotive of North America, Inc., Deer Park, IL (US)

( * ) Notice: Subject to any disclaimer, the term of this patent is extended or adjusted under 35 U.S.C. 154(b) by 163 days.

(21) Appl. No.: 10/834,617

(22) Filed: Apr. 29, 2004

(65) Prior Publication Data

US 2005/0242618 A1 Nov. 3, 2005

(51) Int. Cl.
E05F 5/02 (2006.01)
E05F 15/20 (2006.01)
B60J 5/04 (2006.01)

(52) U.S. Cl. ............... 296/146.4; 296/146.1; 49/26; 49/28

(58) Field of Classification Search ......... 296/146.1, 296/152, 146.4; 49/26–28, 31
See application file for complete search history.

(56) References Cited

U.S. PATENT DOCUMENTS

| 4,458,446 | A | * | 7/1984 | Mochida et al. ............ 49/28 |
| 5,074,073 | A | * | 12/1991 | Zwebner ..................... 49/26 |
| 5,448,446 | A | * | 9/1995 | Honda et al. ............. 361/680 |
| 5,448,856 | A |   | 9/1995 | Moore |
| 5,531,498 | A | * | 7/1996 | Kowall ..................... 296/146.4 |
| 5,563,483 | A | * | 10/1996 | Kowall et al. .............. 318/283 |
| 5,982,126 | A | * | 11/1999 | Hellinga et al. ............ 318/468 |
| 6,046,510 | A | * | 4/2000 | Kawanobe et al. ......... 307/10.1 |
| 6,137,404 | A | * | 10/2000 | O'Connor ................... 340/541 |
| 6,264,268 | B1 |   | 7/2001 | Goodger |
| 6,457,755 | B1 |   | 10/2002 | Nieto |
| 6,848,818 | B2 | * | 2/2005 | Huizenga .................... 362/501 |
| 2001/0042989 | A1 | * | 11/2001 | Greif ............................ 296/50 |

OTHER PUBLICATIONS

Ishii, Hiroshi et al.: *Door Collision Avoidance Sensor*, Research Group Projects and Descriptions, MIT Media Lab: Research at the MIT Media Lab, May 18, 2004, pp. 1-8, www.media.mit.edu/research/ResearchPubWeb.pl?ID=39.

* cited by examiner

*Primary Examiner*—D. Glenn Dayoan
*Assistant Examiner*—Greg Blankenship
(74) *Attorney, Agent, or Firm*—Brian M. Mancini; Terri S. Hughes; Gary J. Cunningham

(57) ABSTRACT

A sensor system for protecting a door of a vehicle from damage includes an electronic sensor operable to detect when an object external to the vehicle is within close proximity to the door of the vehicle. The sensor system provides a signal indicative of the proximity of the external object. The sensor system also includes a blocking hinge mechanism coupled with the signal. The hinge mechanism blocks the opening of the door beyond a distance wherein the vehicle door would strike the object.

17 Claims, 3 Drawing Sheets

SENSOR SYSTEM FOR VEHICLE DOOR

FIELD OF THE INVENTION

This invention in general relates to electronic sensors and, more particularly, to sensors used in protecting vehicle doors.

BACKGROUND OF THE INVENTION

In many parking situations, vehicles are parked in close proximity to each other. In these situations, the opening and closing of vehicle doors can cause accidental damage to the vehicles. In particular, damage can be caused to a vehicle's doors, when the driver or a passenger exits the vehicle, from contact with external objects. The external object can be another vehicle, parking obstacles, objects in the parking lot, and the like. In addition, accidental damage can be inflicted to external objects from the car door. This damage can occur for many reasons including; passenger mistake, a person having their hands full and being unable to catch the door before it opens fully, children that are not strong enough to bold the door, a gust of wind, the vehicle door having a movement detent that is larger than the room available for opening the door, etc.

As can be seen there are a wide variety of different reasons for incurring damage to parked vehicles. Therefore, it is difficult to provide one solution to prevent all these different causes for damage. Prior art solutions for preventing vehicle damage all involve the use of mechanical shielding to absorb the impact of the door. For example, steel edging can be installed on the edge of the door. However, this does not protect the external objects (e.g. other vehicles). In addition, plastic molding can be affixed across the face of a door to protect against hits by other vehicles. However, this does not protect the vehicles fenders and wheel wells. Other mechanical devices can be applied by the vehicle owner. However, this requires extra action and cost on behalf of the vehicle owner. Further, none of these solutions can provide complete protection over all the sides of a vehicle. Also, many of these solutions are unsightly.

Therefore, it is desirable to provide a system to prevent damage by a vehicle door to the vehicle and external objects that the vehicle may be parked near. It would also be of benefit if such system was unobtrusive and required no extra action on the part of a driver or passenger.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, wherein:

DETAILED DESCRIPTION OF THE PREFERRED EMBODIMENTS

The present invention provides an apparatus and method to prevent damage to a vehicle and external objects that the vehicle may be parked near, that overcomes most, if not all, of the preceding problems. Advantageously, the present invention is unobtrusive and requires no extra action on the part of a driver or passenger. Further, many different mechanical and electronic means are provided to bypass the operation of the system of the present invention. The present invention prevents external damage to the car door, through an external sensor and an internal mechanism located within the vehicle. Also, this concept will prevent damage to external objects. A user can open their vehicle door within close proximity to external objects (such as in a parking lot) without fear of hitting the door on anything.

What is described below is a technique to prevent contact between a vehicle door and external objects that might cause accidental damage either to the vehicle door itself, or the objects with which it may come in contact. For purposes of illustration and description, an automobile environment will be used. However, the present invention is not limited to automobiles but can also apply to other vehicles and transportation devices. In particular, a sensor is disposed on the vehicle door in such a way that when an object comes within close proximity to the door, a mechanical mechanism located within the vehicle (e.g. within a hinge of the door) deters a passenger from moving the door any further outward to contact the object, thereby preventing any damaging contact between the door an any external objects.

Preferably, the present invention is only active when the door is being opened from the inside of the vehicle, which is when the majority of accidental damage is done to a vehicle door. Otherwise the system may not allow the vehicle to be opened from outside by sensing the user's hand on the outside of the car as an external object that needs to be avoided. The present invention includes an alert (e.g. visual and/or audio alert), located in the vehicle that would turn on when the system has sensed an object within close proximity of the door. The alert serves the function of notifying the user that the system has sensed an object and that the door will be deterred from opening a full amount. Several overrides of the system are available in case of emergency and in case that the system has sensed something irrelevant (e.g. tall grass, snow on the exterior of the car, etc.).

Figure 1:
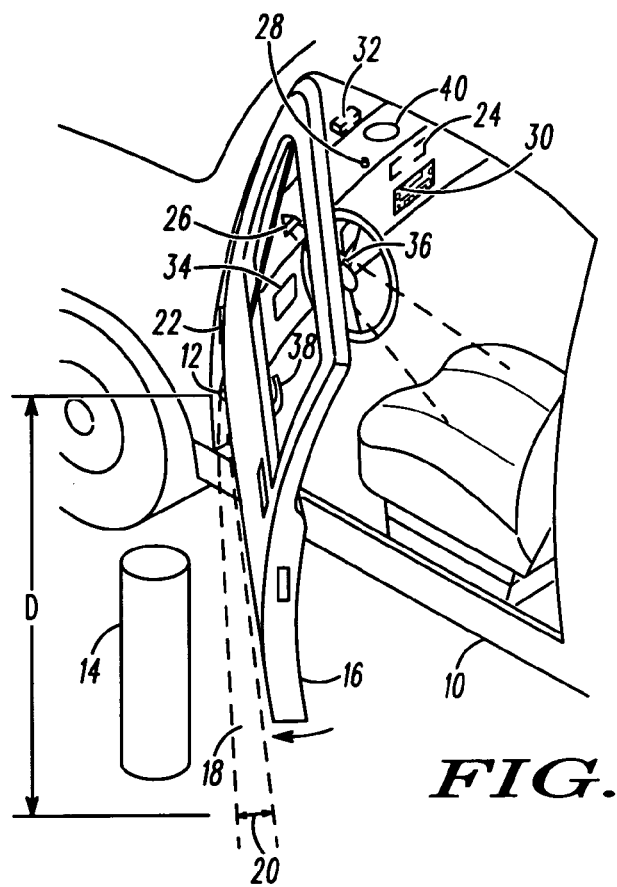
FIG. 1 shows a perspective view of a first embodiment of the present invention.

Referring to FIG. 1, the present invention is incorporated in a vehicle 10. proximity detector 12, including at least one external sensor is disposed on the vehicle to detect external objects 14. Preferably, the sensor is disposed on the vehicle door 16 itself. More preferably, the proximity detector 12 is configured to only detect objects within a predetermined range from the vehicle door 16. The sensor can be configured to only sense that an object is present in proximity to the door, or the sensor can be configured to provide a signal indicative of a distance to the object. For example, the proximity detector can have the capability to not only detect an external object but also to estimate a position of the external object within the respect to the vehicle door. Optionally, a sensor with a larger range or multiple sensors, and under the control of a device such as a microcontroller, can use triangulation, as is known in the art, to determine the distance between the vehicle door and the external object, and to decide when the vehicle door has come too close to the external object. The sensor itself can use any of the different sensing technologies known in the art (e.g.

mechanical, camera with object detection software, optical, thermal, laser, sonar, radar, infrared, capacitive, electric field, magnetic field, etc.) equally well in the present invention.

In the embodiment shown, the sensor of the proximity detector 12 is disposed near a leading edge of the vehicle door 16 and is backward firing. In this configuration, the proximity detector 12 has a narrow scan angle 20 that follows the opening door to scan a surface of the door in order to sense any objects that enter a narrow detection zone 18 when the door is opened. Specifically, the detection zone covers a zone of several centimeters outside of the door surface. The detection zone can be vertically fan-shaped (not shown) to cover a substantial surface area of the door 16. The proximity detector 12 outputs an electrical signal when any external objects 14 enter the zone 18. The sensitivity of the sensor is adjustable such that the sensor will ignore (i.e. not detect) any objects beyond a sensitivity range, D, which is beyond a trailing edge of the vehicle door 16. Or the proximity detector can determine the actual distance to an object and ignore objects that are farther than the edge of the door.

A blocking mechanism 22 is coupled with the signal output from the proximity detector 12. The signal is used to block the door from opening beyond a distance where the external object 14 might be struck by the vehicle door 16. The blocking mechanism 22 deters the door from moving outwardly, but does not prevent the door from moving inwardly (i.e. closing). The blocking mechanism 22 can be controlled directly by the signal from the proximity detector 12, or preferably controlled by a controller 24. The controller 24 can be a processor dedicated for this application or can be an existing processor in the vehicle 10. With a controller 24, the controller 24 is coupled between the proximity detector 12 and the blocking mechanism 22. In this configuration, the controller 24 inputs the signal from the proximity detector 12 for use in directing the blocking action of the blocking mechanism 24, as will be explained in detail below.

It is envisioned that the system of the present invention will not be active at all times. For example, someone returning to their parked car will not wish to be detected as an external object preventing their door from opening. In addition, the system as described will draw some amount of electrical power from the vehicle battery and should turn itself off when a vehicle is not running or shortly thereafter. Therefore, the present invention includes several operational limitations.

One operational limitation for the present invention is to limit operation to only those occasions where a vehicle is occupied by a driver and/or passengers. Therefore, the present invention can include a vehicle occupant detector 26, wherein the occupant detector 26 prevents operation of the system unless an occupant is detected in the vehicle. In the example shown, the occupant detector 26 is a sensor that "views" whether a driver is present. Although only one detector is shown to detect a driver, it should be recognized that occupant detection can apply to not only the driver, but also any and all passengers (e.g. a four door vehicle could have up to four occupant detectors). Preferably, occupant detection is input to the processor 24 and gates operation of the sensor system. As should be recognized, there are many different types of occupant detection (e.g. seat weight detection, etc.) that are known and possible, and each of these various occupant detection techniques can be used equally well in the present invention.

Another operational limitation for the present invention is to provide an override switch 28 that can be used at any time (e.g. emergency, irrelevant external object, talking to pedestrians, etc.). The override switch prevents operation of the system upon activation of the override switch. The override switch 28 can be a manually operated button as shown or any other device, such as voice activation through a microphone 30 and the processor 24, for example.

Another operational limitation for the present invention is to provide an accident detector 32. The accident detector 32 prevents operation of the system upon activation of the accident detector 32. Many types of accident detectors are known in the art, and all of these will work equally well in the present invention. For example, airbag detection, position detection, inertial systems, and the like can be used for accident detectors.

Another operational limitation for the present invention is to provide a speed detector 34 such as a speedometer of the vehicle 10. The speed detector 34 prevents operation of the system if the vehicle is moving (i.e. a speed is registered). This can be a directly gated function or derived through an existing processor of the vehicle.

Another operational limitation for the present invention is to provide an interior door handle sensor 38. The interior door handle sensor 38 prevents operation of the system unless an occupant is touching the interior door handle (i.e. a user can open the door from the outside without having the blocking mechanism activate). The door handle sensor can be provided using many different known techniques, all of which would work equally well in the present invention. For example, a capacitive sensor can detect when someone touches the handle. This can be a directly gated function or derived through an existing processor of the vehicle.

In all of the above cases, an alert 40 can coupled with the system, wherein an alert is provided when an external object is detected. Further, the alert can be a visual (e.g. a light) or audio (e.g. tone from vehicle speaker as shown) warning. In addition, a different alert can be used to indicate to a user that the system is active, or alternatively if the system is inactive or has been overridden.

Figure 2:
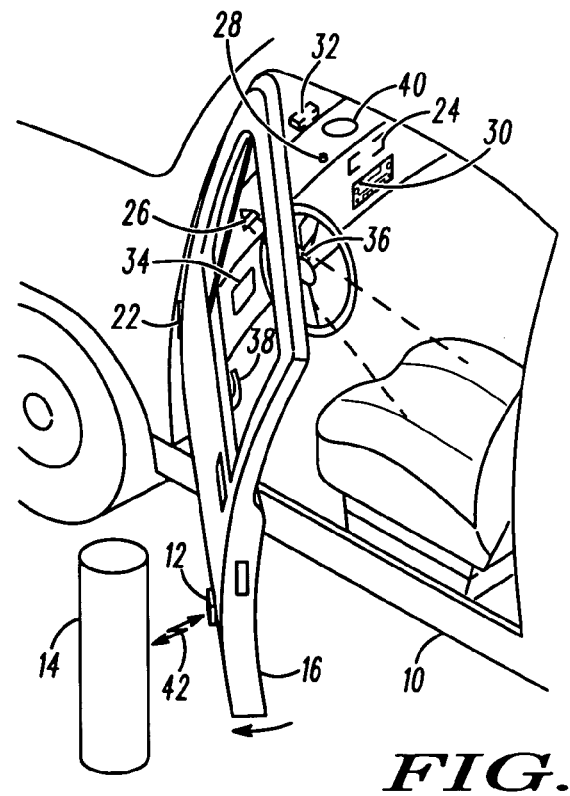
FIG. 2 shows a perspective view of a second embodiment of the present invention.

FIG. 2 shows an alternative embodiment of the present invention. In this embodiment, the proximity detector 12 is configured to fire outwardly and is located near a trailing edge of the door 16 of the vehicle 10. Optionally, the sensor can be fitted linearly anywhere across the door instead of at just one position as shown. In it simplest form, the proximity detector is a sensor with an adjustable sensitivity that is used to signal whether or not an object 14 is within proximity to the door 16. However, the proximity detector 12 could also estimate a position of an object 14 with respect to the vehicle door 16 and provide a position signal for damage prevention. For example, in sonar detection, if the object is within a field of view 42 of the sensor, the time of arrival of a signal reflected from the object can be used to determine a distance of the object from the sensor and the vehicle door. This, along with the pointing position of the sensor can be used to estimate a position of the object 14 and whether it is in a position to damage the door 16 of the vehicle 10. All of the other mechanism and systems as previously described will work in the same way for this embodiment.

Figure 3:
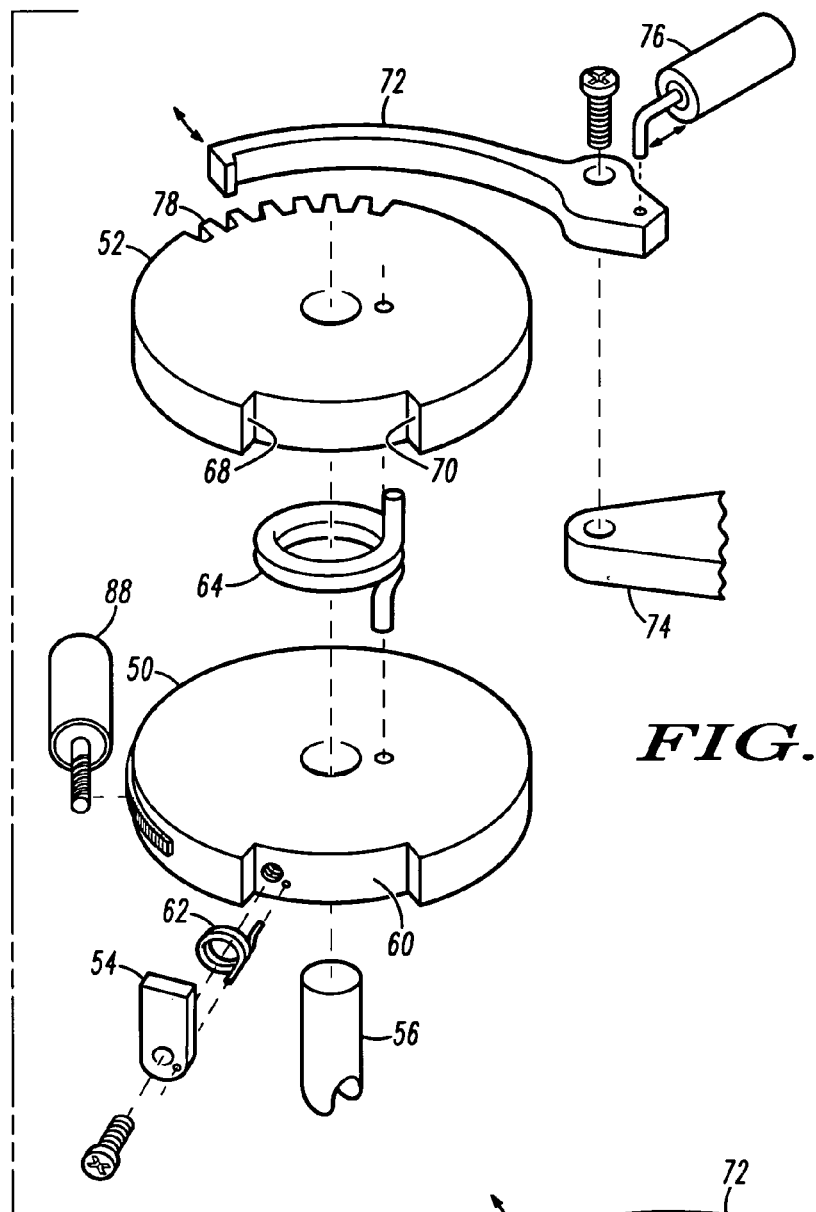
FIG. 3 shows a perspective exploded view of an apparatus, in accordance with the present invention.
Figure 4:
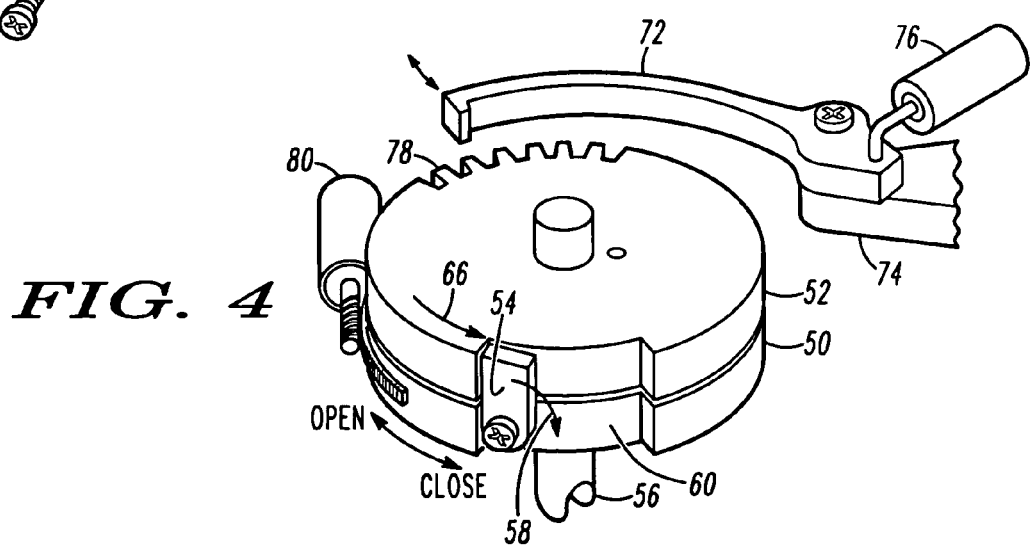
FIG. 4 shows a perspective view of the assembled apparatus of FIG. 3.

FIGS. 3 and 4 show one version of a block mechanism 22, in accordance with the present invention. Of course, it should be recognized that this is only an example, and that there are many various configurations that could be provided by one skilled in the art that can be used equally well in the present invention. In operation, the mechanism 22 deters outward movement of a door past a particular point, but allows free inward movement.

A follower disc 50 is provided that is fixed to the vehicle door (not shown). Preferably, the follower disc 50 is mounted to rotate about an existing hinge pin 56 of the vehicle door. Although a disc configuration is shown, it should be recognized many different configurations could be used. A blocking pin 54 is mounted to the follower disc 50. In a preferred embodiment, the blocking pin 54 is spring mounted to the follower disc, as shown, wherein the spring holds the pin in an upright position. Spring loading allows the blocking pin 54 to rotate 58 into a gap 60 if forced sufficiently to overcome the force of the spring 62. The significance of this will be explained below.

A blocking disc 52 is also mounted on the hinge pin 56. A light spring 64 is used to loosely hold 66 a leading edge 68 of the blocking disc 52 against the blocking pin 54 of the follower disc 50. The blocking disc is otherwise free to move between its leading edge 68 and trailing edge 70. The angular distance between the leading 68 and trailing edges 70 define at least a full operational movement of the door (i.e. follower disc 50) from fully closed to fully open. Under normal operation of the door, the blocking disc 52 and follower disc 50 move in concert, along with the door.

Upon activation of the system (i.e. a signal from the proximity detector) a locking pawl engages teeth 78 of the blocking disc 52. The locking pawl 72 is mounted to the vehicle body and is driven by a solenoid 76 that is directly driven by a signal from the proximity detector or through a controller as explained above. Upon activation of the locking pawl 72, the blocking disc 52 is locked in relation to the vehicle body. The follower disc 50 is rigidly mounted to the door and the blocking pin blocks the door from opening too far by hitting the leading edge 68 of the blocking disc 52. However, upon application of sufficient force on the door, the blocking pin can be made to rotate into the gap 60 allowing full movement (opening) of the door. The use of the movable blocking pin provides the advantages of: a) allowing a user to manually override the mechanism (i.e. a user could never be trapped in the vehicle by the mechanism), b) a fixed or rigid pin could be susceptible to damage from excessive force by the user, and c) a user could override any false actuation of the system such as parking in tall grass for example. Even with the locking pawl 72 engaged, the follower disc and door are allowed full closing movement since the trailing edge 70 is at least beyond the movement range of the blocking pin in the door closed position. The locking pawl can remain engaged for a short period of time after the door is closed or it can engage and disengage directly dependant upon the signal from the proximity detector.

The system of the present invention can also serve to automatically open a door for a driver or passenger. With the addition of a motor 80 that is activated by a user through a switch or other means, the motor can engage the follower disc 50 to drive the door open, either through the limit of the door's movement or as restricted by the blocking mechanism as described above. It is envisioned that the motor would be under control of a separate controller, wherein the controller is operable, upon activation by an occupant, to direct the motor to automatically open the vehicle door up to a limit where the proximity detector detects an object in proximity thereto.

Figure 5:
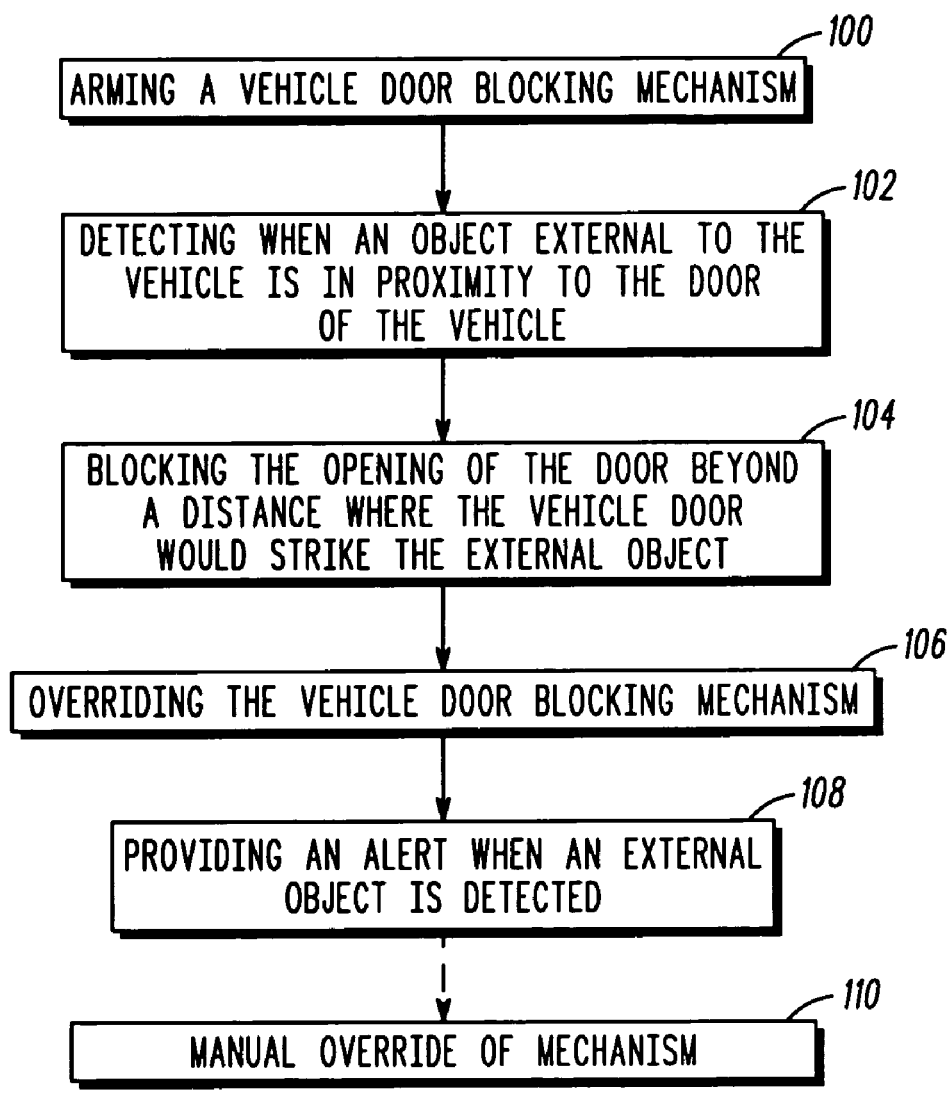
FIG. 5 is a flow chart showing a method in accordance with the present invention.

As shown in FIG. 5, the present invention also provides a method for protecting a door of a vehicle from damage. The method includes a first step 100 of arming a vehicle door blocking mechanism under predetermined circumstances, as explained above. The predetermined circumstances of the arming step include where an occupant is detected within the vehicle and where an occupant is in contact with an interior door handle, as explained previously.

A next step 102 includes detecting when an object external to the vehicle is in proximity to the door of the vehicle. Detecting is performed in accordance with the previously defined system.

A next step 104 includes blocking the opening of the door beyond a distance where the vehicle door would strike the external object as indicated by the detecting step. Blocking is performed in accordance with the previously defined system.

A next step 106 includes overriding the vehicle door blocking mechanism under predetermined circumstances. The predetermined circumstances of the overriding step include where an override switch is activated, where the vehicle is in motion, and where an accident is detected, as explained previously.

Preferably, the method includes a further step 108 of providing an alert when an external object is detected in the detecting step. Alerting is performed in accordance with the previously defined system.

Optionally, the method can include a further step of overriding the door blocking mechanism, after the alert indication. This would provide the user a choice, for that time only, to override the system such as by pressing a button, and this step would take place after the user is notified of an object. For example, parking in tall grass may activate the system and sound an alert, which a user can choose to override.

What has been described is a novel technique to protect vehicles and objects near vehicles from damage. In basic form, the present invention can work with an added sensor and latching mechanism. In a more advanced form, hardware components can be added to a vehicle with such components driven by a software program. Although the present invention adds cost to a vehicle, it is believed that the extra cost can be recovered from the prevention of vehicle damage and subsequent lower insurance costs.

While the present invention has been particularly shown and described with reference to particular embodiments thereof, it will be understood by those skilled in the art that various changes may be made and equivalents substituted for elements thereof without departing from the broad scope of the invention. In addition, many modifications may be made to adapt a particular situation or material to the teachings of the invention without departing from the essential scope thereof. Therefore, it is intended that the invention not be limited to the particular embodiments disclosed herein, but that the invention will include all embodiments falling within the scope of the appended claims.

What is claimed is:

1. A sensor system for protecting a door of a vehicle from damage, the system comprising:
   a proximity detector operable to detect when an object external to the vehicle is in proximity to the door of the vehicle and provide a signal indicative thereof;
   a blocking mechanism coupled with the signal, the blocking mechanism being operable to block the opening of the door beyond a distance where the vehicle door would strike the external object as indicated by the signal; and
   an override mechanism, coupled to the blocking mechanism, the override mechanism being operable to disable the blocking mechanism and allow the vehicle door to open beyond the distance where the vehicle door would strike the external object.

2. The sensor system of claim 1, further comprising a vehicle occupant detector, wherein the occupant detector prevents operation of the system unless an occupant is detected in the vehicle.

3. The sensor system of claim 1, further comprising an accident detector, wherein the accident detector prevents operation of the system upon activation of the accident detector.

4. The sensor system of claim 1, further comprising a speed detector, wherein the speed detector prevents operation of the system if the vehicle is moving.

5. The sensor system of claim 1, further comprising an interior door handle sensor, wherein the interior door handle sensor prevents operation of the system unless an occupant is touching the interior door handle.

6. The sensor system of claim 1, further comprising an alert coupled with the proximity detector, wherein an alert is provided when an external object is detected by the proximity detector.

7. The sensor system of claim 1, further comprising a controller coupled between the proximity detector and the blocking mechanism, wherein the controller inputs the signal from the proximity detector for use in directing the blocking action of the blocking mechanism.

8. The sensor system of claim 7, further comprising a motor coupled with the vehicle door, the motor under control of the controller, wherein the controller is operable, upon activation by an occupant, to direct the motor to automatically open the vehicle door up to a limit where the proximity detector detects an object in proximity thereto.

9. A sensor system for protecting a door of a vehicle from damage, the system comprising:
a proximity detector operable to detect when an object external to the vehicle is in proximity to the door of the vehicle and provide a signal indicative thereof, the proximity detector being mounted near an outer edge of the vehicle door;
a blocking mechanism coupled to a hinge of the vehicle door, the blocking mechanism being operable to block the opening of the door beyond a distance where the vehicle door would strike the external object as indicated by the proximity detector;
a controller coupled between the proximity detector and blocking mechanism, the controller inputs the signal from the proximity detector for use in directing the blocking action of the blocking mechanism;
an arming system coupled to the controller that prevents operation of the system unless the arming system is activated; and
an override system coupled to the controller that prevents operation of the system when the override system is activated such that the door is capable of opening beyond the distance where the vehicle door would strike the external object.

10. The sensor system of claim 9, wherein the arming system includes at least one of the group of a vehicle occupant detector, and an interior door handle sensor.

11. The sensor system of claim 9, wherein the override system includes at least one of the group of an override switch, a vehicle speed detector, and an accident detector.

12. The sensor system of claim 9, further comprising an alert coupled with the proximity detector, wherein an alert is provided when an external object is detected by the proximity detector.

13. The sensor system of claim 9, wherein the proximity sensor is operable to provide a signal that is proportional to a distance to the detected external object, wherein the controller is operable to input the proportional signal to determine an optimum opening distance for the vehicle door before blocking the door.

14. A method for protecting a door of a vehicle from damage, the method comprising the steps of:
arming a vehicle door blocking mechanism under predetermined circumstances;
detecting when an object external to the vehicle is in proximity to the door of the vehicle;
blocking the opening of the door beyond a distance where the vehicle door would strike the external object as indicated by the detecting step; and
overriding the vehicle door blocking mechanism under predetermined circumstances such that the vehicle door is capable of opening beyond the distance where the vehicle door would strike the external object.

15. The method of claim 14, wherein the predetermined circumstances of the arming step include at least one of the group of; where an occupant is detected within the vehicle, and where an occupant is in contact with an interior door handle.

16. The method of claim 14, wherein the predetermined circumstances of the overriding step include at least one of the group of; where an override switch is activated, where the vehicle is in motion, and where an accident is detected.

17. The method of claim 14, further comprising the step of providing an alert when an external object is detected in the detecting step.

* * * * *